(12) United States Patent
Choi et al.

(10) Patent No.: US 10,427,240 B2
(45) Date of Patent: Oct. 1, 2019

(54) TIP CHANGER FOR SPOT WELDING MACHINE

(71) Applicant: OBARA KOREA CORPORATION, Hwaseong-si (KR)

(72) Inventors: Jae Woo Choi, Hwaseong-si (KR); Young Geun Chun, Anyang-si (KR); Kyung Hwa Kwak, Pyeongtaek-si (KR); Seung Woo Park, Daegu (KR); Seung Jin Oh, Seoul (KR); Do Seok Yun, Hwaseong-si (KR)

(73) Assignee: OBARA KOREA CORPORATION, Hwaseong-si (KR)

( * ) Notice: Subject to any disclaimer, the term of this patent is extended or adjusted under 35 U.S.C. 154(b) by 333 days.

(21) Appl. No.: 15/409,823

(22) Filed: Jan. 19, 2017

(65) Prior Publication Data
US 2018/0099348 A1    Apr. 12, 2018

(30) Foreign Application Priority Data

Oct. 7, 2016 (KR) ........................ 10-2016-0129538

(51) Int. Cl.
*B23K 11/30* (2006.01)
*B23K 37/02* (2006.01)

(52) U.S. Cl.
CPC ...... *B23K 11/3072* (2013.01); *B23K 37/0241* (2013.01)

(58) Field of Classification Search
CPC ... B23K 11/30; B23K 11/3072; B23K 11/241; B23K 11/314; B23K 11/315; B23K 11/3063; B23K 11/115; B23K 15/008; B23K 10/022; B23K 37/0241
See application file for complete search history.

(56) References Cited

U.S. PATENT DOCUMENTS 9,505,080 B2 * 11/2016 Nakajima .......... B23K 11/3063

FOREIGN PATENT DOCUMENTS

| JP | 2001-334370 | | 12/2001 |
|---|---|---|---|
| JP | 2005118834 | A | 5/2005 |
| JP | 2009142861 | A | 7/2009 |
| KR | 100318855 | B1 | 12/2001 |
| KR | 100472778 | B1 | 2/2005 |
| KR | 101033891 | B1 | 5/2011 |

* cited by examiner

*Primary Examiner* — Shawntina T Fuqua
(74) *Attorney, Agent, or Firm* — Greer Burns & Crain, Ltd.

(57) ABSTRACT

A tip changer for a spot welding machine includes a first rotation body that has an opening capable of accommodating a welding tip and is capable of rotating around the opening; a second rotation body that is disposed concentrically with the first rotation body and is rotated relative to the first rotation body; and a plurality of nail pieces that are disposed at equal angular intervals along an imaginary circle of the rotation bodies, are swingably connected to the first rotation body by a first connection mechanism, are swingably connected to the second rotation body by a second connection mechanism on a more radially inner side of the second rotation body than the first connection mechanism, and include contact portions on a more radially inner side of the second rotation body than a second connection mechanism.

5 Claims, 7 Drawing Sheets

TIP CHANGER FOR SPOT WELDING MACHINE

BACKGROUND OF THE INVENTION

Field of the Invention

The present invention relates to a tip changer for a spot welding machine, more particularly, relates to a tip changer for a spot welding machine that separates and removes a welding tip of a distal end of a welding gun of the spot welding machine.

Background Art

A spot welding machine is generally known. The spot welding machine is a local welding machine using electrical resistance heat and is generally provided in a form of a welding gun. The welding gun is of a C type, an X type, or the like and a pair of shanks of the welding gun are driven to be capable of closing and separating from each other. Welding tips that are consumable item are mounted on the distal ends of both shanks to be attachable and detachable. The welding tip is instantaneously energized while a workpiece, for example, a steel plate is sandwiched and pressed, and performs welding by melting the workpiece by resistance heat.

The welding tip is deteriorated such as formation of an oxide film and damage of an outer shape even by normal use. Such deterioration causes reduction of welding quality. Therefore, dressing (scraping) is carried out periodically or from time to time depending on a result of inspection to remove the oxide film or restore the outer shape. However, since the welding tip that is too small due to accumulated dressing is inadequate for use, as a result, the welding tip has to be removed for replacement.

A dressing operation of the welding tip is automated by a tip dresser. A removing operation of the welding tip is automated by a tip changer. A configuration, in which the tip dresser and the tip changer are provided together in one device, appears and JP-A-2001-334370 also has such a configuration. In a device provided in JP-A-2001-334370, a configuration, in which a tip grinding portion 43 and a tip pulling-out portion 47 are configured to be operated by one drive system (see FIG. 3 of JP-A-2001-334370).

The tip pulling-out portion 47 of JP-A-2001-334370 is operated such that as illustrated in FIGS. 9, 12 to 15, a rotation base 51 and upper and lower support members 53 are disposed to be relatively movable, a number of nail pieces 50 are rotatably installed in the support members 53 via a support shaft 50 g, a protrusion portion 50c of each nail piece 50 is pushed by both pressing surfaces 51c of each of a number of recessed portions 51b which are opened inward the rotation base 51, and thereby a distal end 50b of each nail piece 50 engages or disengages an outer periphery of an electrode tip 5.

SUMMARY OF THE INVENTION

However, the protrusion portions 50c of the nail piece 50 of JP-A-2001-334370 are disposed in a state of being inserted into the corresponding recessed portions 51b of the rotation base 51. Therefore, it is necessary to secure the rotation base 51 as much as a thickness (see FIG. 5 of the present application) configuring the recessed portion 51b. Therefore, there is a problem that it is difficult to reduce a radius of the rotation base 51.

Since the protrusion portion 50c of the nail piece 50 is operated by being inserted into the recessed portion 51b of the rotation base 51, there is a concern that noise occurs due to clearance.

In addition, a force point, a support point, and an application point are disposed substantially in a straight line. Therefore, a force of the application point (A) when rotating in one direction and a force of the application point (A) in the opposite direction are substantially the same as each other. Therefore, there is a limitation in that it cannot perform that when rotating in one direction and engaging with the electrode tip, the distal end of the nail piece strongly and securely engages with the electrode tip and when rotating in the opposite direction and disengaging with the electrode tip, the distal end of the nail piece can quickly disengage with the electrode tip.

The invention is made to solve the problem of the related art described above and an object thereof is to provide a tip changer for a spot welding machine which can reduce a radius of a first rotation body by making a dynamic connection between the first rotation body and a rail portion be a pin and hole structure.

In addition, another object thereof is to provide a tip changer for a spot welding machine which can reduce occurrence of noise by the pin and hole structure.

In addition, still another object thereof is to provide a tip changer for a spot welding machine which can strongly and reliably engage with an electrode tip when engaging with the electrode tip by rotating in one direction and can quickly disengage with the electrode tip when disengaging with the electrode tip by rotating in the opposite direction by making a force of an application point when rotating in one direction and a force of the application point when rotating in the opposite direction to be different from each other by disposing a force point, a support point, and the application point in an angled line.

A tip changer for a spot welding machine of the invention to achieve the problem described above includes a first rotation body that has an opening capable of accommodating a welding tip and is capable of rotating around the opening; a second rotation body that is disposed concentrically with the first rotation body and is rotated relative to the first rotation body; and a plurality of nail pieces that are disposed at equal angular intervals along an imaginary circle of the rotation bodies, are swingably connected to the first rotation body by a first connection mechanism, are swingably connected to the second rotation body by a second connection mechanism on a more radially inner side of the second rotation body than the first connection mechanism, and include contact portions on a more radially inner side of the second rotation body than a second connection mechanism. At least one of the first connection mechanism and the second connection mechanism has a clearance. While one of the first rotation body and the second rotation body is firstly rotated in one direction or in the opposite direction and then the other is secondly rotated in the same direction, disposition angles of the nail pieces in a radial direction of the rotation bodies are changed by the clearance, and thereby the contact portions perform contact and separation operations with respect to the opening.

Here, it is preferable that at least one of the first connection mechanism and the second connection mechanism is formed by coupling of a hole that is provided in one of two objects to be connected and a pin provided in the other thereof.

The clearance may be provided by being formed in a long hole, a circle, or an ellipse in which the hole has the clearance with respect to a diameter of the pin.

It is preferable that the first connection mechanism, the second connection mechanism, and the contact portions are configured so as not to be present on a straight line.

According to the invention, it is possible to provide the tip changer for the spot welding machine in which the radius of the first rotation body can be reduced by making a dynamic connection between the first rotation body and the rail portion be a pin and hole structure.

In addition, it is possible to provide the tip changer for the spot welding machine in which occurrence of noise can be reduced by the pin and hole structure.

In addition, it is possible to provide the tip changer for the spot welding machine which can strongly and reliably engage with an electrode tip when engaging with the electrode tip by rotating in one direction by an elastic force of the rail portion due to an action of a bent force and can quickly disengage with the electrode tip when disengaging with the electrode tip by rotating in the opposite direction by making a force of an application point when rotating in one direction and a force of the application point when rotating in the opposite direction to be different from each other by disposing a force point, a support point, and the application point in an angled line.

DETAILED DESCRIPTION OF THE INVENTION

Figure 1:
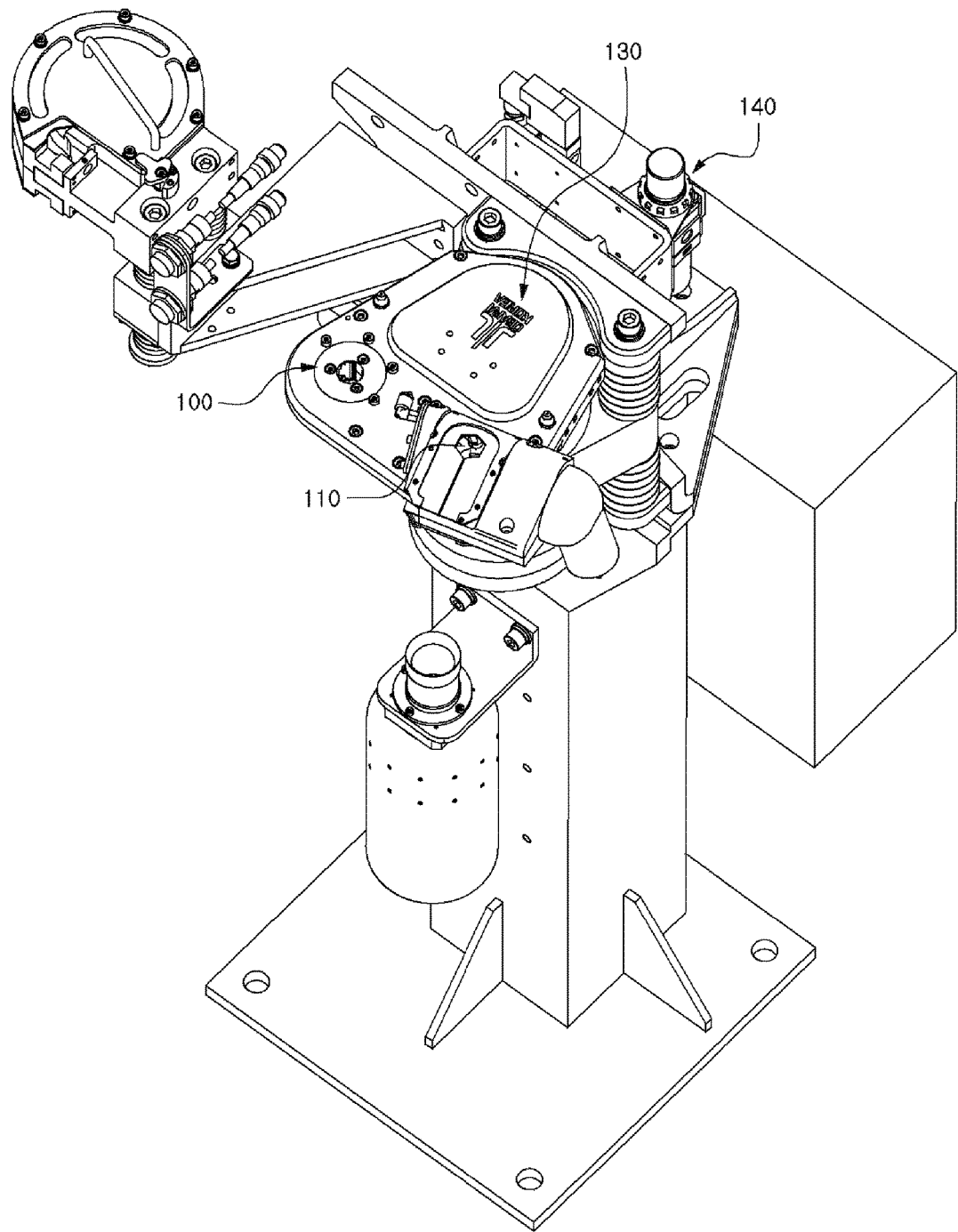
FIG. 1 is a perspective view illustrating an example of a multifunction machine including a tip dresser and a tip changer together.
Figure 2:
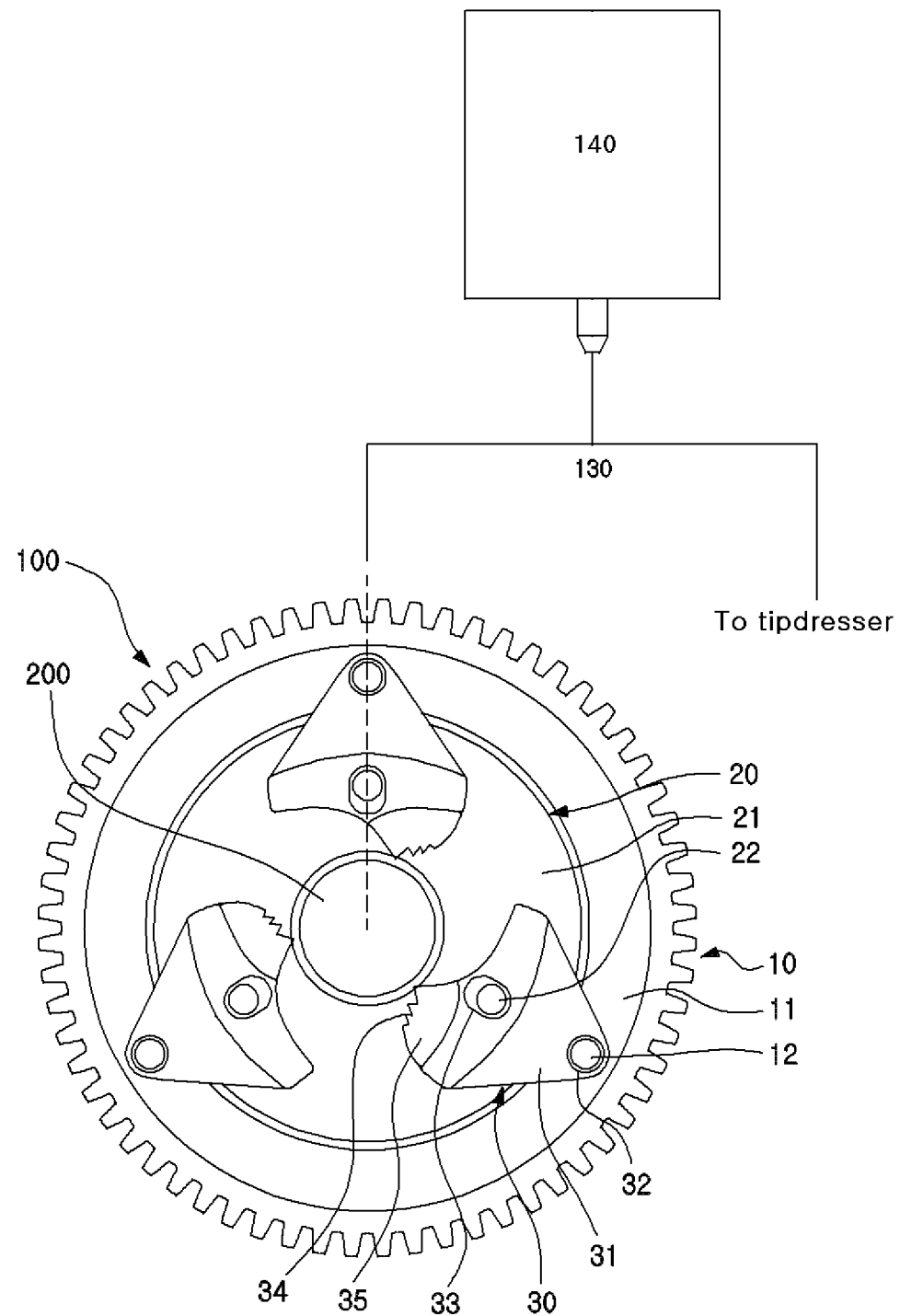
FIG. 2 is a schematic view illustrating a driving portion and a transmission portion (power transmitting portion) in a block together with a plan view of the tip changer of the invention.

Hereinafter, a tip changer for a spot welding machine of the invention will be described in detail with reference to the annexed drawings. However, the same reference numerals are given to portions having the same functions by the same configuration even in different drawings and detailed description thereof may be omitted. For the sake of understanding, members or portions may be exaggerated or may be omitted in the drawings. A functional portion or block may be implemented by being integrated with another portion or block, or the functional portion or block may be implemented by being divided into several portions or blocks. In a case where one portion is connected to another portion, the connection may be implemented in a state where an intermediate member is interposed therebetween.

Basic Configuration

A tip changer 100 for a spot welding machine of the invention is formed to include a first rotation body 10, a second rotation body 20, and a plurality of nail pieces 30. As illustrated in FIG. 1, the tip changer 100 may be configured to share a driving portion 140 and a transmission portion (power transmitting portion) 130 together with a tip dresser 110, but is not limited to the example, and may be also be implemented as the independent or standalone tip changer 100 alone. In addition, the tip changer 100 may be implemented together with a tip supplier (not illustrated).

The first rotation body 10 is a rotation body that may be configured to have a first body 11 having an opening and a first pin 12, and is capable of rotating around the opening. The rotation body 10 may be a donut-shaped rotation body having sprockets around a circumstance thereof. In this case, a driving force of the driving portion 140 may be transmitted to the sprockets of the first rotation body 10 by the transmission portion 130. The opening is a space capable of accommodating a welding tip 200 for the spot welding machine. The first rotation body 10 is provided with one side of a first connection mechanism. In the illustrated example, the first pin 12 is provided in the first connection mechanism.

The second rotation body 20 is a rotation body that may be configured to have a second body 21 and a second pin 22, is disposed coaxially with the first rotation body 10, and is capable of relatively rotating with the first rotation body 10. The second rotation body 20 is provided with one side of a second connection mechanism. In the illustrated example, the second pin 22 is provided in second connection mechanism.

The nail piece 30 may be configured of a body 31, a first hole 32, a second hole 33, a contact portion 34, and a protrusion portion 35, and the nail pieces 30 are disposed at equal angular intervals on an imaginary circle coaxial with an imaginary axis of the first rotation body. In the illustrated example, the three nail pieces 30 are disposed at intervals of 120 degrees, but the number or the angle thereof is not limited to the example. In the illustrated example, the first hole 32 is provided in the first connection mechanism and the second hole 33 is provided in the second connection mechanism.

The nail piece 30 is swingably connected to the first rotation body 10 by the first connection mechanism 12 and 32. The nail piece 30 is provided with the other side of the first connection mechanism.

The nail piece 30 is swingably connected to the second rotation body 20 by the second connection mechanism 22 and 33 on a more radially inner side of the second rotation body than the first connection mechanism 12 and 32. The nail piece 30 is provided with the other side of the second connection mechanism.

The nail piece 30 includes the contact portion 34 on the more radially inner side of the second rotation body than the second connection mechanism 22 and 33. The contact portion 34 may have an irregular structure for enhancing contactability.

At least one of the first connection mechanism 12 and 32 and the second connection mechanism 22 and 33 is formed to have a clearance. In the illustrated example, the second hole 33 of the second connection mechanism 22 and 33 is illustrated to have the clearance by being formed as a long hole, but is not limited to the example. For example, the first hole 32 of the first connection mechanism 12 and may be operated even if the first hole 32 has the clearance. In addition, the clearance may be generated even if sizes of the holes 32 and 33 are maintained without change and a diameter of at least one of the pins 12 and 22 is reduced.

Figure 3A:
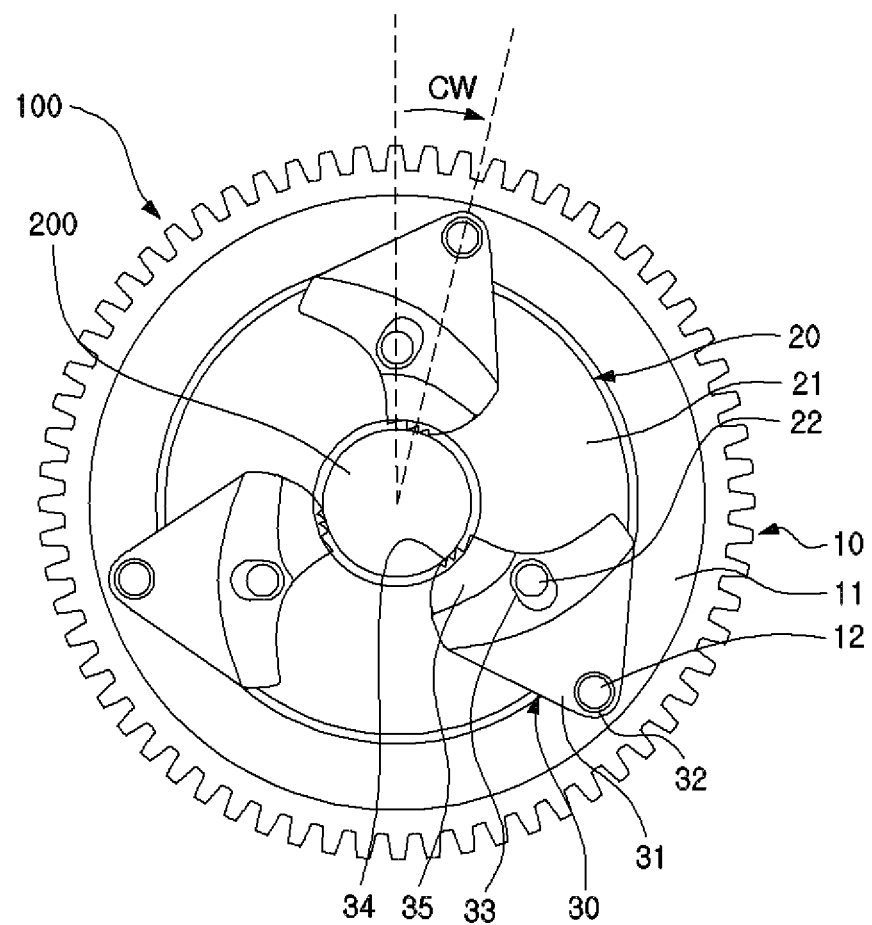
FIG. 3A is a plan view for explaining an engaging operation of the tip changer of the invention and FIG. 3B is a plan view for explaining a disengaging operation thereof.
Figure 3B:
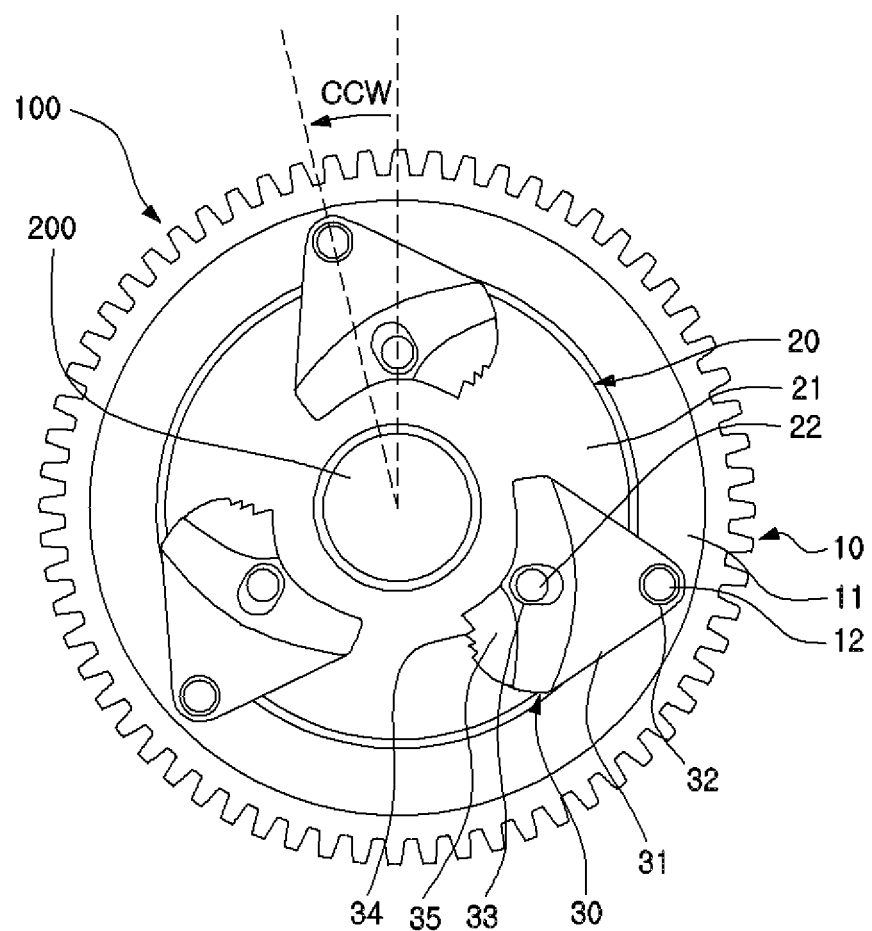

Under such a configuration, as illustrated in FIGS. 3A and 3B, one of the first rotation body 10 and the second rotation body 20 can be firstly rotated. A direction of the rotation is one direction, that is, the clockwise direction (CW) as illustrated in FIG. 3A, or the opposite direction (CCW), that is, the counterclockwise direction as illustrated in FIG. 3B. As firstly rotated, the other of the first rotation body 10 and the second rotation body 20 is secondly rotated in the same direction, that is, in one direction (CW), or the opposite direction (CCW) along with the direction of the first rotation. The second rotation is generated in the same direction because a distance between the first connection mechanism 12 and 32 and the second connection mechanism 22 and 33 is regulated by the nail pieces 30 within a range of the clearance.

As described above, when the first rotation and the second rotation are generated, a disposition angle of the nail pieces 30 with respect to a radial direction of the rotation bodies is changed by the clearance. That is, a pivot movement is generated in which the second connection mechanism 22 and 33 is rotated with respect to the first connection mechanism 12 and 32, or in contrast, the first connection mechanism 12 and 32 is rotated with respect to the second connection mechanism 22 and 33. The contact portion 34 performs a contact and separation operations with respect to the opening according to the pivot movement.

In the example illustrated in FIG. 3A, when engaging with the tip 200, the first rotation body 10 is firstly rotated and the second rotation body 20 is secondly rotated. When the first rotation body 10 receives a driving force through the driving portion 140 and the transmission portion 130 and starts rotation in one direction (CW), the second rotation body 20 that is relatively stationary is relatively stopped or is in a low-speed rotation state by inertia or by a stopping force imparting mechanism (not illustrated). The first pin 12 of the first rotation body 10 moves more in one direction (CW) than the second pin 22 of the second rotation body due to a difference in the relative rotation speeds. Therefore, the first hole 32 coupled to the first pin 12 moves more in one direction (CW) than the second hole 33 coupled to the second pin 22. Therefore, a posture of the nail piece 30 is changed as rotating (spinning) in one direction (CW), the contact portion 34 moves inward in the radial direction thereby coming into contact with the tip 200. Therefore, the tip 200 engages with the tip changer 100.

In contrast, as illustrated in FIG. 3B, even when disengaging with the tip 200, the first rotation body 10 is firstly rotated and the second rotation body 20 is secondly rotated. When the first rotation body 10 receives the driving force through the driving portion 140 and the transmission portion 130 and starts rotation in the opposite direction (CCW), the second rotation body 20 that is relatively stationary or in the rotation state in one direction (CW) is in a low-speed rotation state by inertia. The first pin 12 of the first rotation body 10 moves more than the second pin 22 of the second rotation body in the opposite direction (CCW) due to a difference in a relative rotation speed. Therefore, the first hole 32 coupled to the first pin 12 moves more than the second hole 33 coupled to the second pin 22 in the opposite direction (CCW). Thus, the posture of the nail piece 30 is changed as rotating (spinning) in the opposite direction (CCW) and the contact portion 34 moves outward in the radial direction thereby separating from the tip 200. Therefore, the tip 200 disengages with the tip changer 100.

Figure 5A:
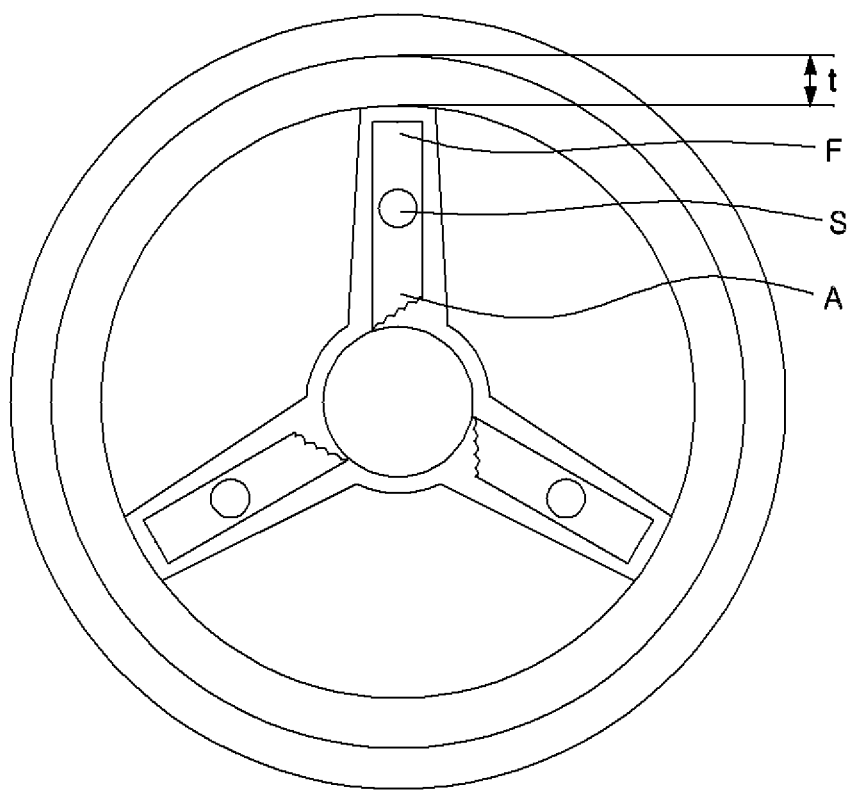
FIG. 5A is a schematic plan view for explaining an effect of the related art and FIG. 5B is a schematic plan view for explaining an effect of the invention.
Figure 5B:
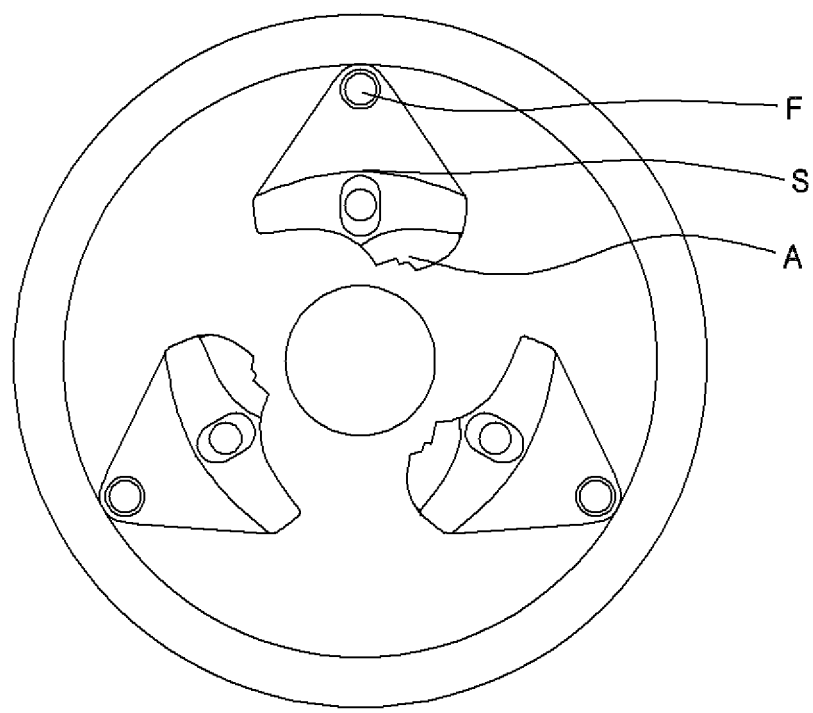

According to such a configuration, since the first connection mechanism 12 and 32 is not provided with a recessed portion and a protrusion portion as in the related art, it is possible to remarkably reduce a dimension in the radial direction and to reduce noise as illustrated in FIG. 5B.

In addition, the first connection mechanism 12 and 32 and the second connection mechanism 22 and 33 may employ a known technique having a configuration other than the recessed portion and the protrusion portion as in the related art.

Embodiment of Hole and Pin

Particularly, it is preferable that at least one of the first connection mechanism 12 and 32 and the second connection mechanism 22 and 33 is formed by coupling of the holes 32 and 33 provided in one of two object to be connected and the pins 12 and 22 provided in the other.

A configuration, in which a connecting member on the first rotation body 10 side is the pin 12 and a connecting member on the nail piece 30 side is the hole 32 in the first connection mechanism, is illustrated. In contrast, a configuration, in which the connecting member on the first rotation body 10 side is a hole and the connecting member on the nail piece 30 side is a pin in the first connection mechanism, may be provided.

A configuration, in which a connecting member on the second rotation body 20 side is the pin 22 and a connecting member on the nail piece 30 side is the hole 33 in the second connection mechanism, is illustrated. In contrast, a configuration, in which the connecting member on the second rotation body 20 side is a hole and the connecting member on the nail piece 30 side is a pin in the second connection mechanism, may be provided.

Shape of Clearance

The clearance may be provided as being formed as a long hole, a circle, or an ellipse in which the holes 32 and 33 have clearances with respect to the diameters of the pins 12 and 22. The clearance may be formed by increasing the size of the hole without changing the size of the pin, or, in contrast, the clearance may be formed by decreasing the size of the pin without changing the size of the hole.

Elastic Contact

It is preferable that the first connection mechanism 12 and 32, the second connection mechanism 22 and 33, and the contact portion 34 are configured so as not to be present on a straight line. The first connection mechanism 12 and 32, the second connection mechanism 22 and 33 and the contact portions 34 operate as a force point (F), a support point (S) and an application point (A), respectively, as shown in FIGS. 3B and 5B.

In the nail piece of the related art as illustrated in FIG. 5A, the force point (F), the support point (S), and the application point (A) are substantially present in a straight line and thereby an elastic force of the body of the nail piece is difficult to be used at the application point (A). Therefore, a pressing force against the electrode tip is poor. The forces of the application point (A) are substantially equal to each other when pressing and releasing the pressure. Therefore, an engaging operation and a disengaging operation are similar to each other.

In the invention, the force point (F), the support point (S), and the application point (A) are not present on a straight line. Thus, it is possible to introduce a difference in the engaging operation and the disengaging operation. That is, it is possible to perform pressing by using the elastic force by reliably applying a force when engaging and to quickly eliminate pressing with a weak force when disengaging. This is because a direction in which the force point (F) moves and a direction in which the application point (A) moves are different when the support point (S) is a center. In FIG. 5B, when the force point (F) moves in the clockwise direction (right side), the application point (A) moves in a center direction (lower side). Therefore, the body of the nail piece is easily bent in an L shape and the bending elastic force can be applied to the application point (A). In contrast, when the force point (F) moves in the opposite direction (left side), the application point (A) immediately moves on the radial direction (upper side). Therefore, the pressing force is quickly eliminated.

As described above, the invention is described in detail with reference to the annexed drawings, but the invention is not limited to the examples.

Figure 4:
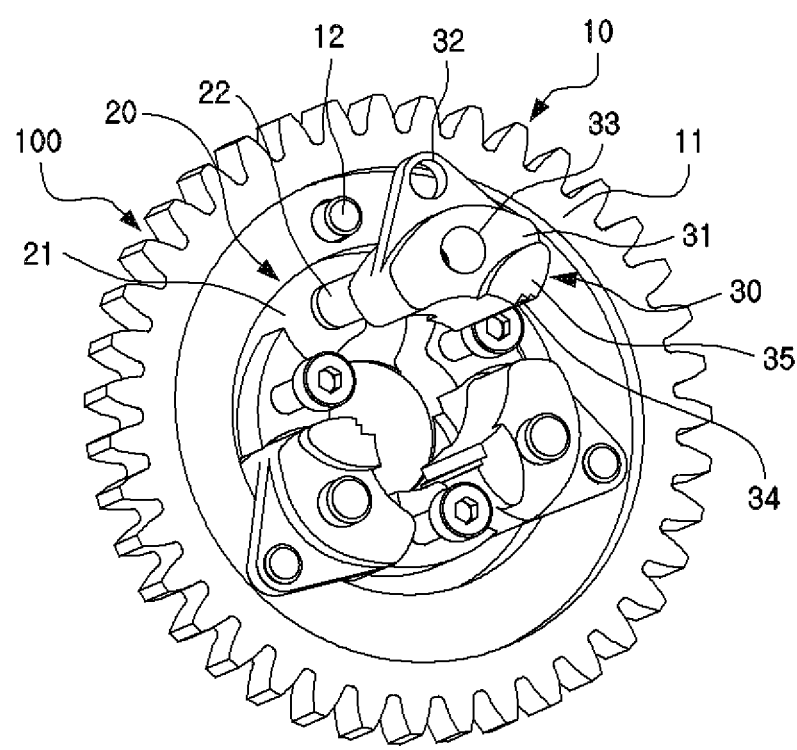
FIG. 4 is a perspective view illustrating a state of an assembling process of the tip changer of the invention.

For example, a protrusion portion 35 of FIG. 4 is a configuration for preventing the nail piece 30 from releasing from an operation trajectory due to rotation vibration when the first rotation body 10 and the second rotation body 20 are rotated, and a guide groove into which the protrusion portion 35 is inserted may be provided on an inner side of a cover member. Therefore, there is an effect that vibration energy can be concentrated as a pressing force against the tip 200 by correcting deviation of the trajectory.

In a case of a configuration in which the first rotation body 10 is driven, a stopping force imparting mechanism which is not shown may be provided to impart stopping inertia to the second rotation body 20 against the first rotation body 10. Therefore, the relative rotation is reliably provided and a gripping operation of the contact portion 34 against the tip 200 can be reliably provided.

Accordingly, technique of an extent to which a person skilled in the art easily deforms, improves, and changes the scope of the claims is to be construed as falling within the scope of the invention.

The invention can be used in the industry of the tip changer for the spot welding machine.

What is claimed is:

1. A tip changer for a spot welding machine comprising:
   a first rotation body that has an opening capable of accommodating a welding tip and is capable of rotating around the opening;
   a second rotation body that is disposed concentrically with the first rotation body and is rotated relative to the first rotation body; and
   a plurality of nail pieces that are disposed at equal angular intervals along an imaginary circle of the first a second rotation bodies, are swingably connected to the first rotation body by a first connection mechanism, are swingably connected to the second rotation body by a second connection mechanism on a more radially inner side of the second rotation body than the first connection mechanism, and include contact portions on a more radially inner side of the second rotation body than a second connection mechanism,
   wherein at least one of the first connection mechanism and the second connection mechanism is formed to have a clearance, and
   wherein while one of the first rotation body and the second rotation body is firstly rotated in one direction or in the opposite direction and then the other of the first rotation body and the second rotation body is secondly rotated in the same direction, disposition angles of the nail pieces in a radial direction of the rotation bodies are changed by the clearance, and thereby the contact portions perform contact and separation operations with respect to the opening,
   wherein the first connection mechanism, the second connection mechanism and the contact portions operate as a force point (F), a support point (S) and an application point (A), respectively, and a direction in which the force point (F) moves and a direction in which the application point (A) moves are to be different when the support point (S) is a center so that elastic force of the body of the nail piece can be used at the application point,
   wherein the first connection mechanism, the second connection mechanism, and the contact portions are not present on a straight line,
   wherein a force at an application point (A) when rotating in one direction and a force at the application point (A) when rotating in the opposite direction is different from each other by disposing a force point (F), a support point (S), and the application point (A) not in straight line but in an angled line, and
   wherein when the force point (F) moves in one lateral direction, the application point (A) moves in a center direction, so that the body of the nail piece is easily bent and the bending elastic force can be applied to the application point (A), and when the force point (F) moves in the opposite direction to the one lateral direction, the application point (A) immediately moves on the radial direction, so that the pressing force is quickly eliminated.

2. The tip changer for a spot welding machine according to claim 1,
   wherein at least one of the first connection mechanism and the second connection mechanism is formed by coupling of a hole that is provided in one of two objects to be connected and a pin provided in the other thereof.

3. The tip changer for a spot welding machine according to claim 2,
   wherein the clearance is formed in a long hole, a circle, or an ellipse in which the hole has the clearance with respect to a diameter of the pin.

4. The tip changer for a spot welding machine according to claim 1,
   wherein a protrusion portion is provided to prevent the nail pieces from releasing from an operation trajectory due to rotation vibration when the first rotation body and the second rotation body are rotated, and a guide groove into which the protrusion portion is inserted is provided on an inner side of a cover member covering the nail pieces so that vibration energy can be concentrated as a pressing force against the tip by correcting deviation of the trajectory of the nail pieces.

5. A spot welding machine comprising:
   the tip changer according to claim 1.

* * * * *

UNITED STATES PATENT AND TRADEMARK OFFICE
CERTIFICATE OF CORRECTION

PATENT NO. : 10,427,240 B2
APPLICATION NO. : 15/409823
DATED : October 1, 2019
INVENTOR(S) : Choi et al.

Page 1 of 1

It is certified that error appears in the above-identified patent and that said Letters Patent is hereby corrected as shown below:

In the Claims

In Column 7, Line 41, delete "a" and insert --and-- therefore.

Signed and Sealed this
Tenth Day of December, 2019

Andrei Iancu
*Director of the United States Patent and Trademark Office*